(12) United States Patent
Kim et al.

(10) Patent No.: US 7,903,191 B2
(45) Date of Patent: Mar. 8, 2011

(54) DISPLAY DEVICE

(75) Inventors: Young-Man Kim, Seongnam-si (KR);
Tae-Kyung Lee, Seongnam-si (KR);
Hwan-Jin Kim, Suwon-si (KR);
Tae-Hun Kim, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 247 days.

(21) Appl. No.: 12/178,224

(22) Filed: Jul. 23, 2008

(65) Prior Publication Data

US 2009/0180047 A1    Jul. 16, 2009

(30) Foreign Application Priority Data

Jan. 10, 2008    (KR) .......................... 10-2008-002864

(51) Int. Cl.
*G02F 1/1333*    (2006.01)

(52) U.S. Cl. .......................................................... 349/58

(58) Field of Classification Search ............... 349/58–60
See application file for complete search history.

(56) References Cited

U.S. PATENT DOCUMENTS

| 6,597,416 | B1 * | 7/2003 | Momose ......................... 349/60 |
| 6,847,415 | B1 * | 1/2005 | Yoshimura et al. ............. 349/58 |
| 6,961,103 | B2 * | 11/2005 | Sung et al. ...................... 349/58 |
| 7,432,998 | B2 * | 10/2008 | Nishio et al. .................... 349/58 |
| 2005/0024553 | A1 * | 2/2005 | Fukuta et al. ................... 349/58 |
| 2005/0243239 | A1 * | 11/2005 | Kondo et al. ................... 349/58 |
| 2008/0174715 | A1 * | 7/2008 | Suh et al. ........................ 349/60 |

* cited by examiner

*Primary Examiner* — Sung H Pak
(74) *Attorney, Agent, or Firm* — Cantor Colburn LLP

(57) ABSTRACT

A display device includes a display panel displaying an image, a driving circuit substrate electrically connected to the display panel and having a contact member mounted on one side thereof, a frame accommodating the display panel and the driving circuit substrate and having a through hole, and an accommodating member arranged below the frame and coupled to the frame, wherein the contact member contacts the accommodating member through the through hole.

12 Claims, 5 Drawing Sheets

DISPLAY DEVICE

This application claims priority to Korean Patent Application No. 10-2008-0002864, filed on Jan. 10, 2008, and all the benefits accruing therefrom under 35 U.S.C. §119, the contents of which in its entirety are herein incorporated by reference.

BACKGROUND OF THE INVENTION

1. Field of the Invention

The present invention relates to a display device and more particularly, to a display device in which static electricity discharging performance is improved.

2. Description of the Related Art

An electronic appliance such as a mobile communication terminal, a television, and a notebook computer has its own display device for displaying images. Currently, flat panel display devices are widely used as such display devices.

A liquid crystal display ("LCD") device, a representative flat panel display device, displays an image by using electrical and optical characteristics of liquid crystals. An LCD device has an advantage in terms of thickness, weight, power consumption, and driving voltage, which is a main reason why the LCD device draws more attention in the field of displays.

An LCD device includes a display panel for displaying an image and a driving circuit device for driving the display panel. The driving circuit device is easily damaged when a high-voltage static electricity is applied thereto. Such a damage leads to poor display quality in an LCD device.

BRIEF SUMMARY OF THE INVENTION

The present invention solves problems associated with conventional devices by providing a display device with an effective grounding structure for improving static electricity discharging performance of a driving circuit device.

In exemplary embodiments of the present invention, a display device includes a display panel displaying an image, a driving circuit substrate connected to the display panel and having a contact member mounted on one side thereof, a frame accommodating the display panel and the driving circuit substrate and having a through hole, and an accommodating member arranged below the frame and coupled to the frame, wherein the contact member contacts the accommodating member through the through hole.

A light source may be mounted on one side of the driving circuit substrate.

The driving circuit substrate may be accommodated from above the frame.

The light source may be a light emitting diode ("LED").

The contact member may be formed in any of a circular cylindrical form, an elliptic cylindrical form, and a polygonal prism form.

The contact member may be made of a metal-based material.

The contact member may be formed from an elastic material coated with a conductive material.

The driving circuit substrate may be made of a flexible material.

The accommodating member may include a protruding portion and the contact member may contact the protruding portion of the accommodating member through the through hole.

In other exemplary embodiments of the present invention, a display device, includes a display panel displaying an image, a driving circuit substrate connected to the display panel and having a contact member mounted on one side thereof, a frame accommodating the display panel and the driving circuit substrate and having a through hole, and an accommodating member arranged below the frame, coupled to the frame and having a protruding portion, wherein the contact member contacts the protruding portion through the through hole.

A light source may be mounted on one side of the driving circuit substrate.

The driving circuit substrate may be accommodated from above the frame.

The light source may be a light emitting diode ("LED").

One of the contact member and the protruding portion may be inserted into the other of the contact member and the protruding portion.

The contact member may be formed in any of a circular cylindrical form, an elliptic cylindrical form, and a polygonal prism form.

The protruding portion may have an insertion groove into which the contact member is inserted.

The protruding portion may have an insertion hole into which the contact member is inserted.

The protruding portion may protrude in any of a circular cylindrical form, an elliptic cylindrical form, and a polygonal prism form.

The contact member may have an insertion groove into which the protruding portion is inserted.

The contact member may be made of one of a metal-based material and an elastic material coated with a conductive material.

The driving circuit substrate may be made of a flexible material.

The protruding portion may contact at least two faces of the contact member.

BRIEF DESCRIPTION OF THE DRAWINGS

The above and other features of the present invention will be described in reference to certain exemplary embodiments thereof with reference to the attached drawings in which.

DETAILED DESCRIPTION OF THE INVENTION

Figure 1:
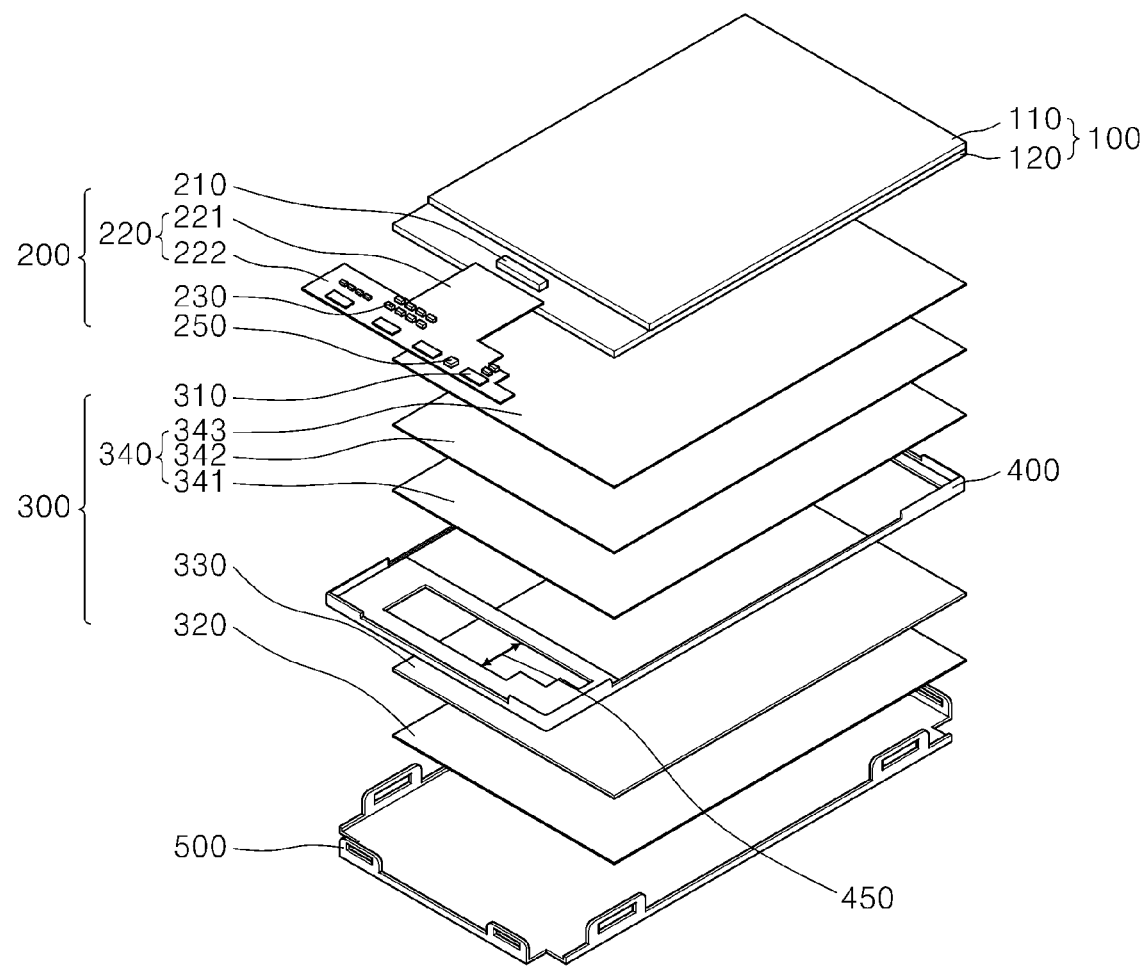
FIG. 1 is an exploded perspective view illustrating an exemplary display device according to exemplary embodiments of the present invention.

Reference will now be made in detail to the embodiments of the present invention, examples of which are illustrated in the accompanying drawings, wherein like reference numerals refer to the like elements throughout. The embodiments are described below in order to explain the present invention by referring to the figures. It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Hereinafter, the present invention will be described in detail with reference to the accompanying drawings.

FIG. 1 is an exploded perspective view illustrating an exemplary display device according to exemplary embodiments of the present invention.

As shown in FIG. 1, the display device includes a display panel 100, a panel driving portion 200, a backlight unit 300, a frame 400, and an accommodating member 500.

The display panel 100 receives light, such as light from backlight unit 300, ambient light, etc., to display an image. To this end, the display panel 100 includes a color filter array substrate 110 and a thin film transistor ("TFT") array substrate 120 with a liquid crystal layer (not shown) for adjusting light transmittance interposed therebetween.

The color filter array substrate 110 includes a black matrix (not shown), a color filter (not shown), and a common electrode (not shown) which are formed on a substrate made of glass or plastic. Alternatively, the color filter may be formed on the TFT array substrate 120.

The TFT array substrate 120 includes a plurality of gate lines (not shown) and a plurality of data lines (not shown) which are formed on a substrate made of glass or plastic in a matrix form. The TFT array substrate 120 further includes a plurality of TFTs (not shown) formed at crossing points of the gate lines and the data lines and a pixel electrode (not shown) electrically connected to the TFTs. In an alternative exemplary embodiment, the common electrode may also be formed on the TFT array substrate 120, in which case the common electrode and the pixel electrode may be formed in stripes.

The panel driving portion 200 drives the display panel 100 for displaying an image. The panel driving portion 200 includes a driving integrated circuit ("IC") 210 mounted on the display panel 100, and a driving circuit substrate 220 electrically connected to the display panel 100 to supply electrical power and various signals to the driving IC 210 and display panel 100.

The driving IC 210 may be mounted on one side of the TFT array substrate 120 by a chip on glass ("COG") method.

The driving circuit substrate 220 is connected to one side of the TFT array substrate 120 to supply electrical power and various signals which are necessary in the display panel 100 and the driving IC 210. The driving circuit substrate 220 includes a wire line portion 221 having a plurality of wire lines (not shown) for transmitting signals to the display panel 100 and a substrate portion 222 on which an electronic element 230, a contact member 250, and a light source 310 are mounted. The electronic element 230, the contact member 250, and the light source 310 are mounted on one side of the substrate portion 222. A plurality of electronic elements 230 are mounted on the substrate portion 222 to generate electrical power and various signals to be provided to the display panel 100 and the driving IC 210. The contact member 250 is made of a conductive material such as metal and is mounted on a ground pad (not shown) formed on the substrate portion 222.

The driving circuit substrate 220 may further include a heat discharging pad for discharging heat generated in the light source 310. The heat discharging pad may be arranged in an empty space of the substrate portion 222.

The driving circuit substrate 220 is formed of a flexible printed circuit board ("FPCB") made of a flexible material and is accommodated in the frame 400 which will be described later in detail. The light source 310 will also be described later in detail.

The frame 400 is arranged below the display panel 100 and accommodates the display panel 100 and the driving circuit substrate 220 to protect them from external shocks. The frame 400 is made of a material for absorbing a shock, such as plastic. The frame 400 has a through hole 450 formed at a location where the driving circuit substrate 220 is accommodated.

The through hole 450 is formed in a bottom of the frame 400 with an area size smaller than an area of the driving circuit substrate 220. The through hole 450 provides a space for accommodating the light source 310 and the contact member 250 mounted on one side of the driving circuit substrate 220.

The backlight unit 300 is accommodated in the frame 400 to provide light to the display panel 100. To this end, the backlight unit 300 includes a light source 310, a reflecting sheet 320, a light guide plate 330, and an optical sheet 340.

The light source 310 generates light to be provided to the display panel 100. The light source 310 is mounted on one side of the driving circuit substrate 220 and provides light at a side of the display panel 100. The light source 310 may include a plurality of light emitting diodes ("LEDs").

The light guide plate 330 guides light emitted from the light source 310 located at a side thereof to the display panel 100 located thereabove. The light guide plate 330 is formed in a plate form and may be made of a plastic-based material like acrylic. Also, various patterns for changing a progress direction of incident light are formed on a bottom of the light guide plate 330.

The reflecting sheet 320 is arranged below the light guide plate 330 and upwardly reflects light which is downwardly emitted from the light guide plate 330, to reduce light loss. The reflecting sheet 320 may be formed such that a basic material is coated with a material with high light reflectivity.

The optical sheet 340 is arranged above the light guide plate 330, and diffuses and collects light guided by the light guide plate 330 to be directed to the display panel 100. The optical sheet 340 includes a diffusing sheet 341, a prism sheet 342, and a protection sheet 343. The diffusing sheet 341 diffuses light incident from the light guide plate 330 and then emits diffused light towards the prism sheet 342. The prism sheet 342 collects light diffused by the diffusing sheet 341 to be vertically incident to the display panel 100. The protection sheet 343 protects the prism sheet 342 from damage which may be caused by friction with the display panel 100.

The accommodating member 500 is arranged below the frame 400 and may be coupled to a hook (not shown) formed on a side of the frame 400. The accommodating member 500 protects the backlight unit 300 from an external shock together with the frame 400. The accommodating member 500 is made of a metal-based material to improve shock absorbing performance and grounding performance.

Hereinafter, a display device according to exemplary embodiments of the present invention is described below in more detail with reference to FIGS. 1 to 5.

Figure 2:
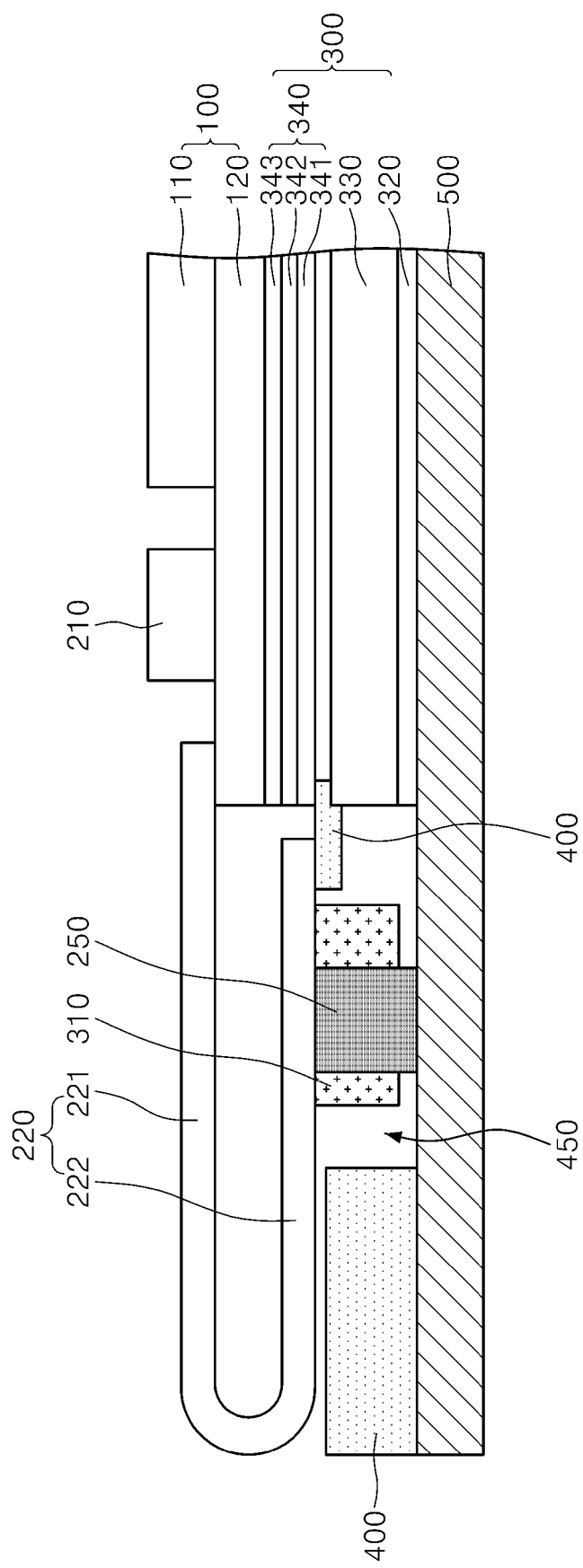
FIG. 2 is a cross-sectional view illustrating an exemplary display device according to one exemplary embodiment of the present invention.

FIG. 2 is a cross-sectional view illustrating an exemplary display device according to one exemplary embodiment of the present invention. Here, FIG. 2 can be understood as a cross-sectional view of an assembled exemplary display device of FIG. 1.

Referring to FIG. 2, in the exemplary display device according to one exemplary embodiment of the present invention, the contact member 250 mounted on one side of the driving circuit substrate 220 is rested on and contacts a top surface of the accommodating member 500 through the through hole 450 of the frame 400.

The display device of FIG. 2 includes the display panel 100, the panel driving portion 200, the backlight unit 300, the frame 400, and the accommodating member 500.

The panel driving portion 200 includes the driving IC 210 mounted on the TFT array substrate 120 and the driving circuit substrate 220 which contacts the TFT array substrate 120. The light source 310 and the contact member 250 are mounted on one side of the driving circuit substrate 220. The driving circuit substrate 220 is folded such that one side of the substrate portion 222, on which the light source 310 and the contact member 250 are mounted, faces the frame 400. The contact member 250 contacts a top surface of the accommodating member 500, a surface that faces the substrate portion 222, through the through hole 450 of the frame 400. The contact member 250 may be mounted on a ground pad (not shown) formed at an end of a ground line (not shown) made of a conductive material, whereby the contact member 250 is electrically connected to the driving circuit substrate 220. The contact member 250 electrically connects the driving circuit substrate 220 and the accommodating member 500 to thereby improve static electricity discharging performance.

The contact member 250 is made of a conductive material. The contact member 250 as a ground element may be formed in any shape, including that of a circular cylindrical form, an elliptic cylindrical form, and a polygonal prism form. In an exemplary embodiment, the contact member 250 may be formed in a rectangular or square prism form made of metal. The contact member 250 may be mounted on the driving circuit substrate 220 by a conductive tape or a conductive adhesive to be electrically connected to the driving circuit substrate 220. The contact member 250 may be formed such that an elastic material, such as sponge, is coated with a conductive material. In this instance, a contact area for contacting the accommodating member 500 is increased, thereby improving a grounding effect.

The contact member 250 is formed at a height which is greater than the thickness of a bottom of the frame 400 so that the contact member 250 can stably contact the accommodating member 500 through the through hole 450.

The display device of FIG. 2 may have a similar configuration to that of FIG. 1, and thus a description of like elements will be omitted.

A display device according to other exemplary embodiments of the present invention is described below with reference to FIGS. 3 to 5.

Figure 3:
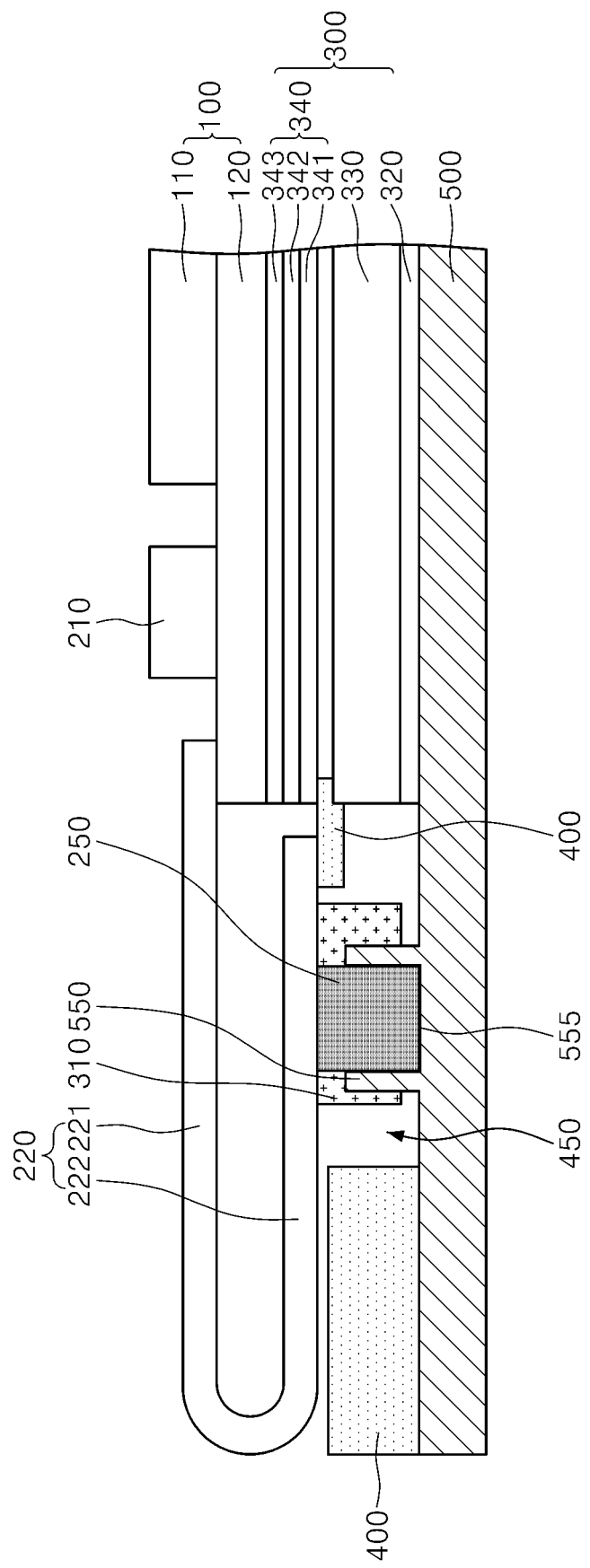
FIG. 3 is a cross-sectional view illustrating an exemplary display device according to another exemplary embodiment of the present invention.
Figure 4:
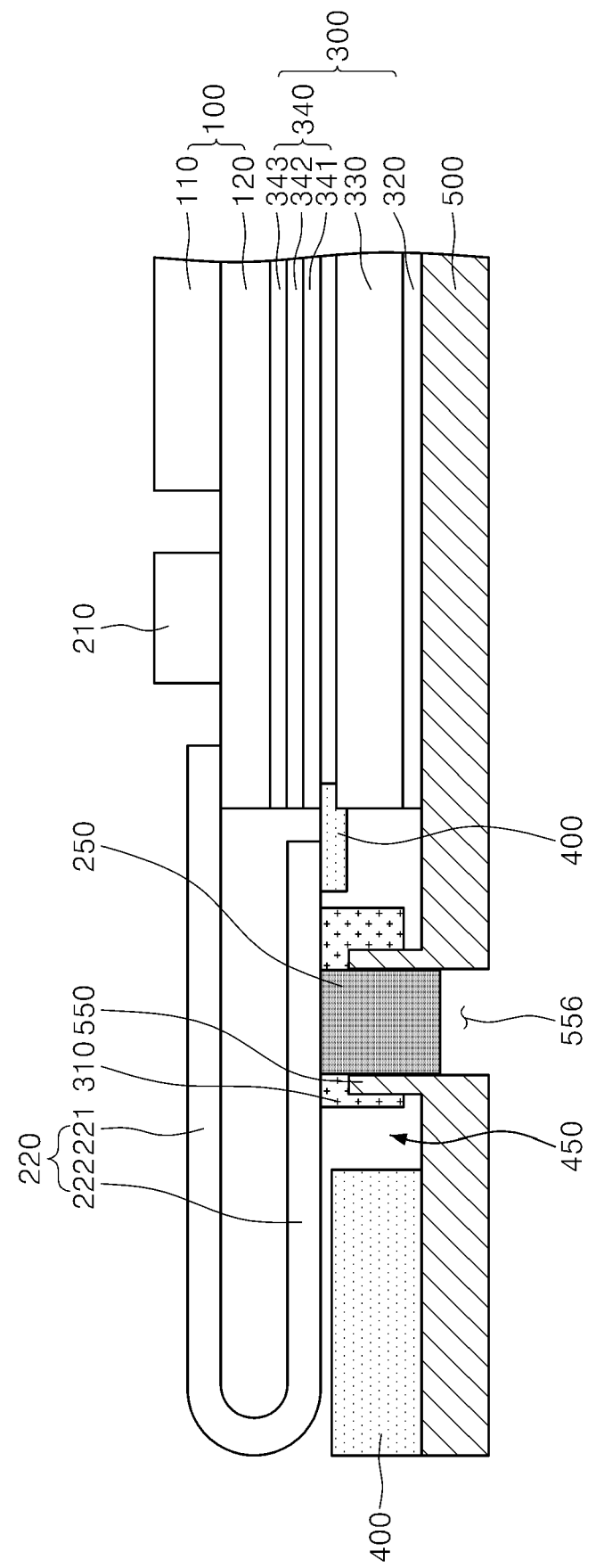
FIG. 4 is a cross-sectional view illustrating an exemplary display device according to yet another exemplary embodiment of the present invention.
Figure 5:
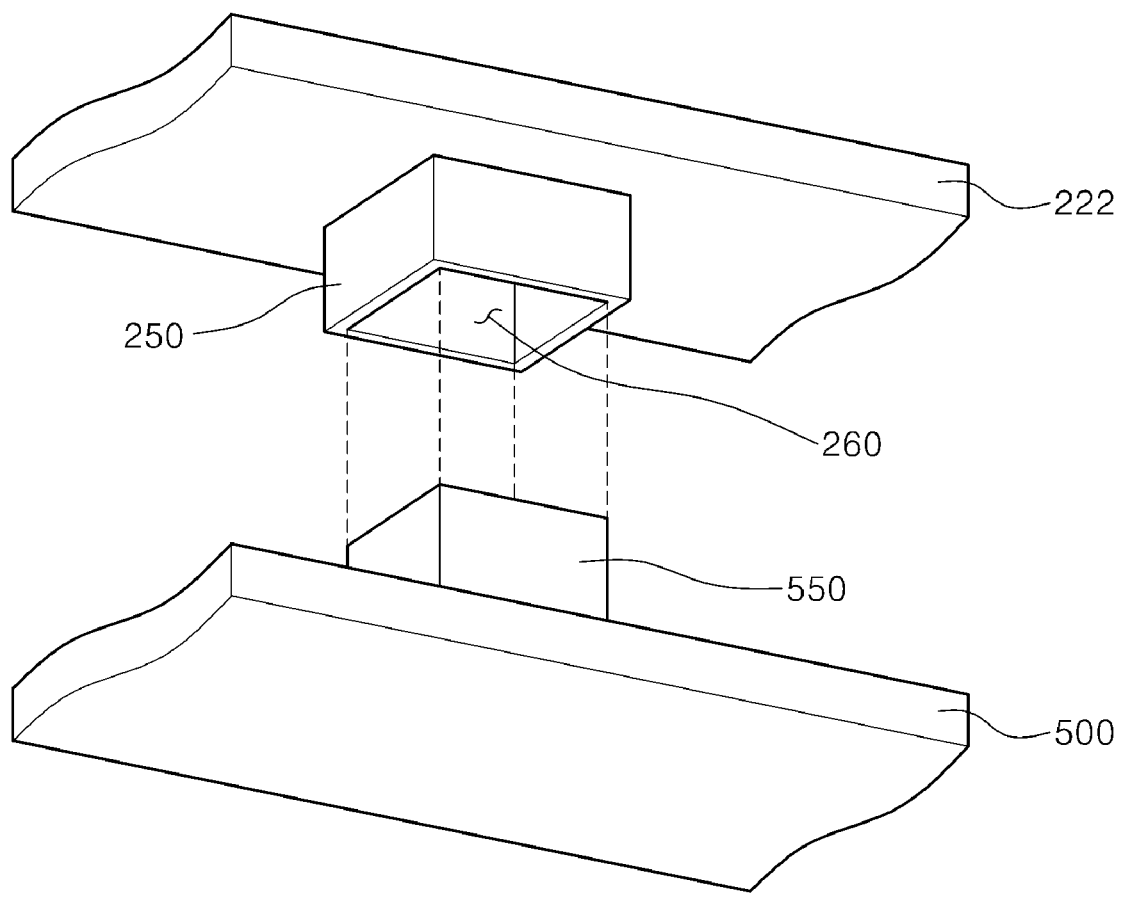
FIG. 5 is an exploded perspective view illustrating a portion of an exemplary display device according to still another exemplary embodiment of the present invention.

FIGS. 3 to 5 show a display device according to other exemplary embodiments of the present invention. In particular, FIGS. 3 to 5 show an insertion structure of the contact member and the accommodating member. FIGS. 3 and 4 can be understood as a cross-sectional view of the display device of FIG. 1.

Referring to FIGS. 3 to 5, the display device according to other exemplary embodiments of the present invention is configured such that one of the contact member 250 mounted on the driving circuit substrate 220 and a protruding portion 550 protruding from the accommodating member 500 are inserted into the other of the contact member 250 and the protruding portion 550.

The contact member 250 may be made of an elastic material coated with a metal-based material or a conductive material and is then mounted on the substrate portion 222 of the driving circuit substrate 220. The contact member 250 may be formed in any shape, including that of a circular cylindrical form, an elliptic cylindrical form, and a polygonal prism form. For example, the contact member 250 is formed of a hexagonal, rectangular, or square prism form made of metal. The contact member 250 may be mounted on a ground pad (not shown) of the substrate portion 222 by a conductive adhesive.

In the accommodating member 500, the protruding portion 550 is formed to face the driving circuit substrate 220. With reference to FIG. 3, the protruding portion 550 has an insertion groove 555 into which the contact member 250 is inserted. The insertion groove 555 is formed in a form corresponding to the contact member 250. For example, when the contact member 250 is formed in a square prism form, the insertion groove 555 of a square form is formed. The protruding portion 550 contacts two or more sides of the contact member 250 inserted into the insertion groove 555. Thus, an increase in contact area between the contact member 250 and the accommodating member 500 improves static electricity discharging performance between the accommodating member 500 and the driving circuit substrate 220.

In an alternative exemplary embodiment, as shown in FIG. 4, the protruding portion 550 has an insertion hole 556 into which the contact member 250 is inserted. The insertion hole 556 is formed in a form corresponding to a bottom form of the contact member 250. For example, when the contact member 250 is formed in a square prism form, the insertion hole 556 of a square form is formed in the protruding portion 500.

In yet another alternative exemplary embodiment, as shown in FIG. 5, the contact member 250 with an insertion groove 260 formed therein, into which the protruding portion 550 is inserted, may be mounted on the substrate portion 222. The contact member 250 is formed in a form for surrounding the protruding portion 550. For example, when the protruding portion 550 is formed in a hexahedron form, the contact member 250 is formed in a hexahedron form with the insertion groove 260 having a square or rectangular cross-sectional shape into which the protruding portion 550 is inserted.

The display device according to the exemplary embodiments of the present invention shown in FIGS. 3 to 5 is similar in configuration to that of FIG. 1, and thus a description of like elements will be omitted.

The display device according to the exemplary embodiments of the present invention shown in FIGS. 3 to 5 is configured such that one of the contact member 250 and the protruding portion 550 of the accommodating member 500 are inserted into the other, whereby a movement of elements is prevented and a grounding area is increased, leading to excellent grounding performance.

As described above, since the contact member mounted on the driving circuit substrate contacts the accommodating member through the through hole of the frame, the display device according to the present invention has the driving circuit substrate with excellent ground performance, thereby efficiently discharging static electricity. As a result, damage of the driving circuit substrate caused by static electricity is prevented, leading to excellent display quality.

Although the present invention has been described with reference to certain exemplary embodiments thereof, it will be understood by those skilled in the art that a variety of modifications and variations may be made to the present invention without departing from the spirit or scope of the present invention defined in the appended claims, and their equivalents.

What is claimed is:

1. A display device comprising:
   a display panel displaying an image;
   a driving circuit substrate connected to the display panel and having a contact member mounted on one side thereof;
   a frame accommodating the display panel and the driving circuit substrate and having a through hole; and
   an accommodating member arranged below the frame, coupled to the frame and having a protruding portion,
   wherein the contact member contacts the protruding portion through the through hole and one of the contact member and the protruding portion is inserted into the other of the contact member and the protruding portion.

2. The display device of claim 1, further comprising a light source mounted on one side of the driving circuit substrate.

3. The display device of claim 2, wherein the driving circuit substrate is accommodated from above the frame.

4. The display device of claim 3, wherein the light source is a light emitting diode.

5. The display device of claim 1, wherein the contact member is formed in any of a circular cylindrical form, an elliptic cylindrical form, and a polygonal prism form.

6. The display device of claim 5, wherein the protruding portion has an insertion groove into which the contact member is inserted.

7. The display device of claim 5, wherein the protruding portion has an insertion hole into which the contact member is inserted.

8. The display device of claim 1, wherein the protruding portion protrudes in any of a circular cylindrical form, an elliptic cylindrical form, and a polygonal prism form.

9. The display device of claim 8, wherein the contact member has an insertion groove into which the protruding portion is inserted.

10. The display device of claim 1, wherein the contact member is made of one of a metal-based material and an elastic material coated with a conductive material.

11. The display device of claim 1, wherein the driving circuit substrate is made of a flexible material.

12. The display device of claim 1, wherein the protruding portion contacts at least two faces of the contact member.

* * * * *